(12) United States Patent
Shu et al.

(10) Patent No.: US 9,954,444 B1
(45) Date of Patent: Apr. 24, 2018

(54) PFM-PWM CONTROL FOR POWER REGULATORS

(71) Applicant: Marvell International Ltd., Hamilton HM (BM)

(72) Inventors: Biing Long Shu, Siglap (SG); Jinho Choi, Saratoga, CA (US); Hao Peng, Sunnyvale, CA (US); Wanfeng Zhang, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 153 days.

(21) Appl. No.: 14/609,060

(22) Filed: Jan. 29, 2015

Related U.S. Application Data

(60) Provisional application No. 61/933,729, filed on Jan. 30, 2014.

(51) Int. Cl.
*H02M 3/335* (2006.01)
(52) U.S. Cl.
CPC ............... *H02M 3/33507* (2013.01)
(58) Field of Classification Search
CPC ..... H02M 3/33507; H02M 2001/0032; H02M 3/33523; H02M 2001/0035; H02M 3/156; H02M 3/157; H02M 1/14; H02M 1/44; H02M 2001/0003; Y02B 70/16
See application file for complete search history.

(56) References Cited

U.S. PATENT DOCUMENTS

| | | | | |
|---|---|---|---|---|
| 8,289,732 B2* | 10/2012 | Li | ..................... | H02M 3/33515 363/21.12 |
| 2009/0279332 A1* | 11/2009 | Grant | ................ | H02M 3/33515 363/84 |
| 2014/0211519 A1* | 7/2014 | Hsu | ..................... | H02M 1/4258 363/21.17 |

* cited by examiner

*Primary Examiner* — Henry Lee, III

(57) ABSTRACT

A method includes generating output power based on a switching signal, comparing the output power to a target power, increasing the output power using a pulse frequency modulation (PFM) and pulse width modulation (PWM) when the output power is less than the target power, and decreasing the output power using the PFM and PWM when the output power is greater than the target power. An apparatus includes a power regulator configured to generate output power based on a switching signal, and a pulse frequency and width modulation (PFWM) controller coupled to the power regulator, and configured to compare the output power to a target power and to increase or decrease the output power using a PFM and pulse PWM according to the comparison result.

20 Claims, 6 Drawing Sheets

PFM-PWM CONTROL FOR POWER REGULATORS

CROSS REFERENCE TO RELATED APPLICATION

This present disclosure claims the benefit of U.S. Provisional Application No. 61/933,729 filed on Jan. 30, 2014, which is incorporated by reference herein in its entirety.

BACKGROUND

Switching regulators such as flyback regulators and buck regulators use one or more inductors and capacitors to store energy in order to convert electrical power from one form into another form. Switching regulators can be used to convert. Alternating Current (AC) to Direct Current (DC) (AC-DC regulators) or convert DC to DC having a different voltage and/or polarity (DC-DC regulators).

Some of these switching power regulators use pulse frequency modulation (PFM), in which the amplitude and width of square pulses are maintained constant while varying the repetition rate of the square pulses. However, such a switching power regulator that uses PFM may operate in a predetermined range of switching frequencies, and thus capacity of the switching power regulator is limited by the predetermined range of switching frequencies.

SUMMARY

In an embodiment, a method includes generating output power based on a switching signal, comparing the output power to a target power, increasing the output power using a pulse frequency modulation (PFM) and pulse width modulation (PWM) when the output power is less than the target power, and decreasing the output power using the PFM and PWM when the output power is greater than the target power.

In an embodiment, increasing the output power using the PFM and PWM includes determining whether a frequency of the switching signal is less than a maximum frequency of the switching signal, increasing a frequency of the switching signal and maintaining an on-time of the switching signal substantially the same when the frequency of the switching signal is less than the maximum frequency, and increasing the on-time of the switching signal and maintaining the frequency of the switching signal substantially the same when the frequency of the switching signal is equal to or greater than the maximum frequency.

In an embodiment, increasing the output power using the PFM and PWM includes determining whether an on-time of the switching signal is less than a maximum duration of the switching signal, increasing the on-time of the switching signal and maintaining a frequency of the switching signal substantially the same when the on-time of the switching signal is less than the maximum duration, and increasing the frequency of the switching signal and maintaining the on-time of the switching signal substantially the same when the on-time of the switching signal is equal to or greater than the maximum duration.

In an embodiment, decreasing the output power using the PFM and PWM includes determining whether a frequency of the switching signal is greater than a minimum frequency, decreasing the frequency of the switching signal and maintaining an on-time of the switching signal substantially the same when the frequency of the switching signal is greater than the minimum frequency, and decreasing the on-time of the switching signal and maintaining the frequency of the switching signal substantially the same when the frequency of the switching signal is equal to or less than the minimum frequency.

In an embodiment, decreasing the output power using the PFM and PWM includes determining whether an on-time of the switching signal is greater than a minimum duration of the switching signal, decreasing the on-time of the switching signal and maintaining a frequency of the switching signal substantially the same when the on-time of the switching signal is greater than the minimum duration, and decreasing the frequency of the switching signal and maintaining the on-time of the switching signal substantially the same when the on-time of the switching signal is equal to or less than the minimum duration.

In an embodiment, an apparatus includes a power regulator configured to generate output power based on a switching signal, and a pulse frequency and width modulation (PFWM) controller coupled to the power regulator, and configured to compare the output power to a target power and to increase or decrease the output power using a pulse frequency modulation (PFM) and pulse width modulation (PWM) according to the comparison result.

In an embodiment, the apparatus further includes a switching device coupled between the power regulator and the PFWM controller and configured to receive the switching signal from the PFWM controller and cause a current to flow through the switching device according to the switching signal. The PFWM controller is configured to determine whether a frequency of the switching signal is less than a maximum frequency of the switching signal, to increase the frequency of the switching signal and maintain an on-time of the switching signal substantially the same to increase the output power when the frequency of the switching signal is less than the maximum frequency, and to increase the on-time of the switching signal and maintain the frequency of the switching signal substantially the same to increase the output power when the frequency of the switching signal is equal to or greater than the maximum frequency.

In an embodiment, the apparatus further includes a switching device coupled between the power regulator and the PFWM controller and configured to receive the switching signal from the PFWM controller and cause a current to flow through the switching device according to the switching signal. The PFWM controller is configured to determine whether an on-time of the switching signal is less than a maximum duration of the switching signal, to increase the on-time of the switching signal and maintain a frequency of the switching signal substantially the same to increase the output power when the on-time of the switching signal is less than the maximum duration, and to increase the frequency of the switching signal and maintain the on-time of the switching signal substantially the same to increase the output power when the on-time of the switching signal is equal to or greater than the maximum duration.

In an embodiment, the apparatus further includes a switching device coupled between the power regulator and the PFWM controller and configured to receive the switching signal from the PFWM controller and cause a current to flow through the switching device according to the switching signal. The PFWM controller is configured to determine whether a frequency of the switching signal is greater than a minimum frequency, to decrease a frequency of the switching signal and maintain an on-time of the switching signal substantially the same to decrease the output power when the frequency of the switching signal is greater than the minimum frequency, and to decrease the on-time of the switching signal and maintain the frequency of the switching signal substantially the same to decrease the output power when the frequency of the switching signal is equal to or less than the minimum frequency.

In an embodiment, the apparatus further includes a switching device coupled between the power regulator and the PFWM controller and configured to receive the switching signal from the PFWM controller and cause a current to flow through the switching device according to the switching signal. The PFWM controller is configured to determine whether an on-time of the switching signal is greater than a minimum duration of the switching signal, to decrease the on-time of the switching signal and maintain a frequency of the switching signal substantially the same to decrease the output power when the on-time of the switching signal is greater than the minimum duration, and to decrease the frequency of the switching signal and maintain the on-time of the switching signal substantially the same to decrease the output power when the on-time of the switching signal is equal to or less than the minimum duration.

DETAILED DESCRIPTION

Figure 1:
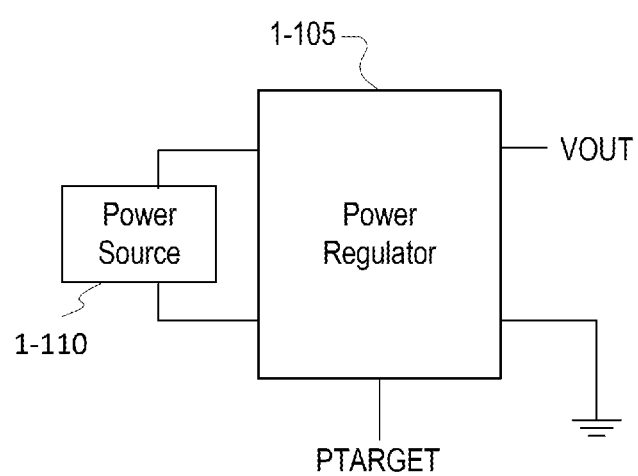
FIG. 1 is a block diagram of a regulator system.

FIG. 1 is a block diagram of a regulator system 1-100 including a power regulator 1-105 and a power source 1-110. The power source 1-110 is an AC or a DC power source, and provides input power to the power regulator 1-105. The power regulator 1-105 uses reactive components, such as inductors and capacitors, to store energy in order to convert electrical power from one form, such as the form produced by the power source 1-110, into another form, such as output voltage VOUT. The power regulator 1-105 varies a value of the output voltage VOUT according to a power target signal PTARGET.

Figure 2:
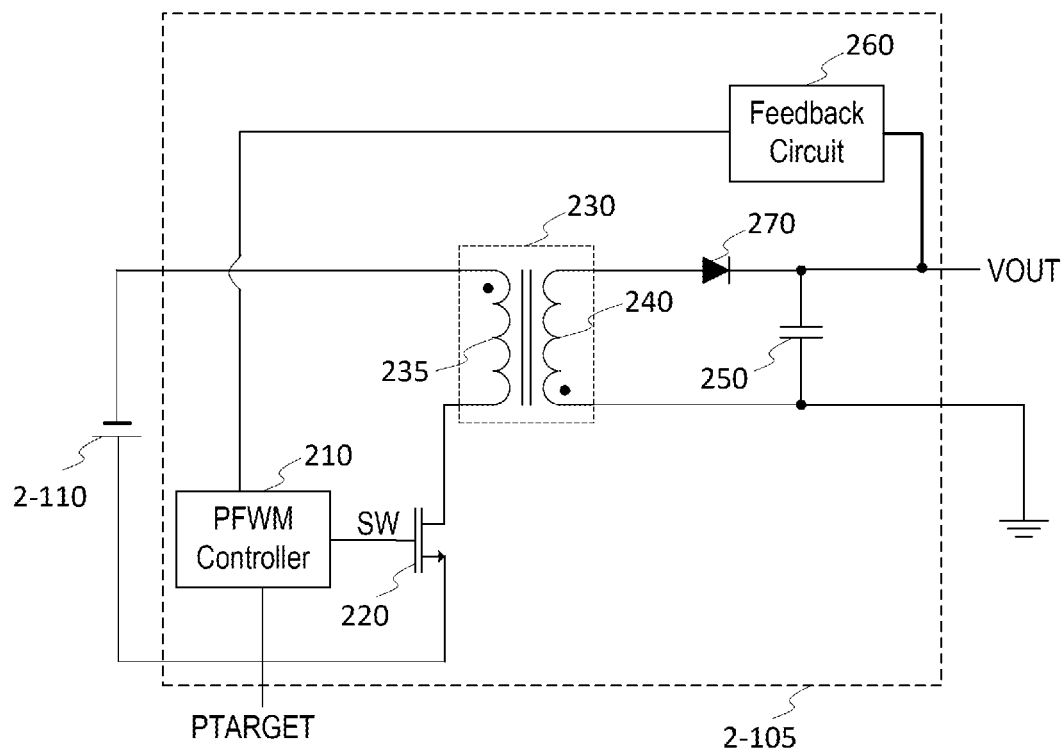
FIG. 2 is a circuit diagram for a regulator system including a flyback regulator according to an embodiment.

FIG. 2 is a circuit diagram for a regulator system 2-100 including a power regulator 2-105 according to an embodiment. The power regulator 2-105 is a DC-DC flyback regulator that receives input power from a DC power source 2-110 and uses a flyback transformer 230 as an energy-storing inductor.

Although FIG. 2 shows the DC power source 2-110, embodiments are not limited thereto. In an embodiment, the power source 2-110 is an AC power source (not shown) connected to a bridge rectifier or other rectifier circuit (not shown), which rectifies an AC voltage from the AC power source and is connected to a first terminal of a primary winding 235 of the flyback transformer 230.

The flyback transformer 230 includes the primary winding 235 and a secondary winding 240. The primary winding 235 is used to store energy into the flyback transformer 230, i.e., to charge the flyback transformer 230. The secondary winding 240 is used to extract energy from the flyback transformer 230, i.e., to discharge the flyback transformer 230. In an embodiment, the flyback transformer 230 is a magnetic core transformer with or without an air gap. In an embodiment, the flyback transformer 230 is an air core transformer. In an embodiment, the secondary winding 240 includes a plurality of secondary windings, each of which is coupled to a corresponding one of a plurality of diodes and a corresponding one of a plurality of capacitors.

A first switched terminal of a switching device 220 is connected to a second terminal of the primary winding 235. The switching device 220 is shown as a Metal Oxide Semiconductor Field Effect Transistor (MOSFET), but may be a junction FET (JFET), bipolar junction transistor (BJT), insulated-gate bipolar transistor, or similar device or circuit. The switching device may be an N-type or P-type device and may be an enhancement or depletion mode device.

A control terminal of the switching device 220 is connected to a Pulse Frequency and Width Modulation (PFWM) Controller 210. The PFWM Controller 210 provides a switching signal SW having pulses to the switching device 220 to turn the switching device 220 on and off within each cycle of the pulses. The PFWM controller 210 operates in a combined mode that includes operating at times in the PFM mode and at times in the PWM mode, as will be described below with reference to FIGS. 3A and 3B.

A person of ordinary skill in the art would understand, based on the disclosures and teachings provided herein, that a variety of structures and techniques can be used to implement the PFWM Controller 210. For example, the PFWM Controller 210 may include an integrated circuit comprising a microcontroller or microprocessor executing a computer program stored on a non-transitory computer-readable storage medium. The PFWM Controller 210 may also include an oscillator, Analog-to-Digital Converter (ADC), voltage reference, and/or a comparator. Furthermore, the switching device 220 and the PFWM Controller 210 may be provided together in a single semiconductor chip or integrated circuit, or packaged together as a single semiconductor device.

A first terminal of the secondary winding 240 of the flyback transformer 230 is connected to an anode of a diode 270. A cathode of the diode 270 is connected to a first terminal of a capacitor 250. A second terminal of the secondary winding 240 of the flyback transformer 230 is connected to a second terminal of the capacitor 250. A voltage at the first terminal of the capacitor 250 is the output voltage VOUT. The capacitor 250 may be a polymer, ceramic, electrolytic, or other suitable capacitor.

A feedback circuit 260 detects the output voltage VOUT and provides a feedback signal including information on the output voltage VOUT to the PFWM Controller 210. The PFWM Controller 210 receives a target power from an external source through a power target signal PTARGET.

Based on the provided feedback signal, the PFWM Controller 210 determines whether the output power becomes substantially equal to, greater than, or less than the target power and controls the switching signal SW accordingly, as will be described below in more detail.

Although FIG. 2 shows the feedback circuit 260 coupled to the secondary winding 240 of the flyback transformer 230, embodiments are not limited thereto. In an embodiment, a tertiary winding (not shown) is coupled to the primary winding 235 of the flyback transformer 230 and the PFWM Controller 210 such that the tertiary winding voltage is rectified in a similar manner to that of rectifying the secondary winding voltage and the PFWM Controller 210 receives the rectified tertiary winding voltage as the feedback signal. In this embodiment, the rectified tertiary voltage is proportional to the output voltage VOUT. Since the rectified tertiary voltage serves as the feedback signal provided by the feedback circuit 260, the feedback circuit 260 may be omitted. In another embodiment, the feedback signal may be based on effect produced by the output voltage VOUT, such as a luminosity of a light emitting diode (LED), a speed of a motor, and so on. In another embodiment, the PFWM Controller 210 operates in an open loop mode without using the feedback signal.

Figure 3A:
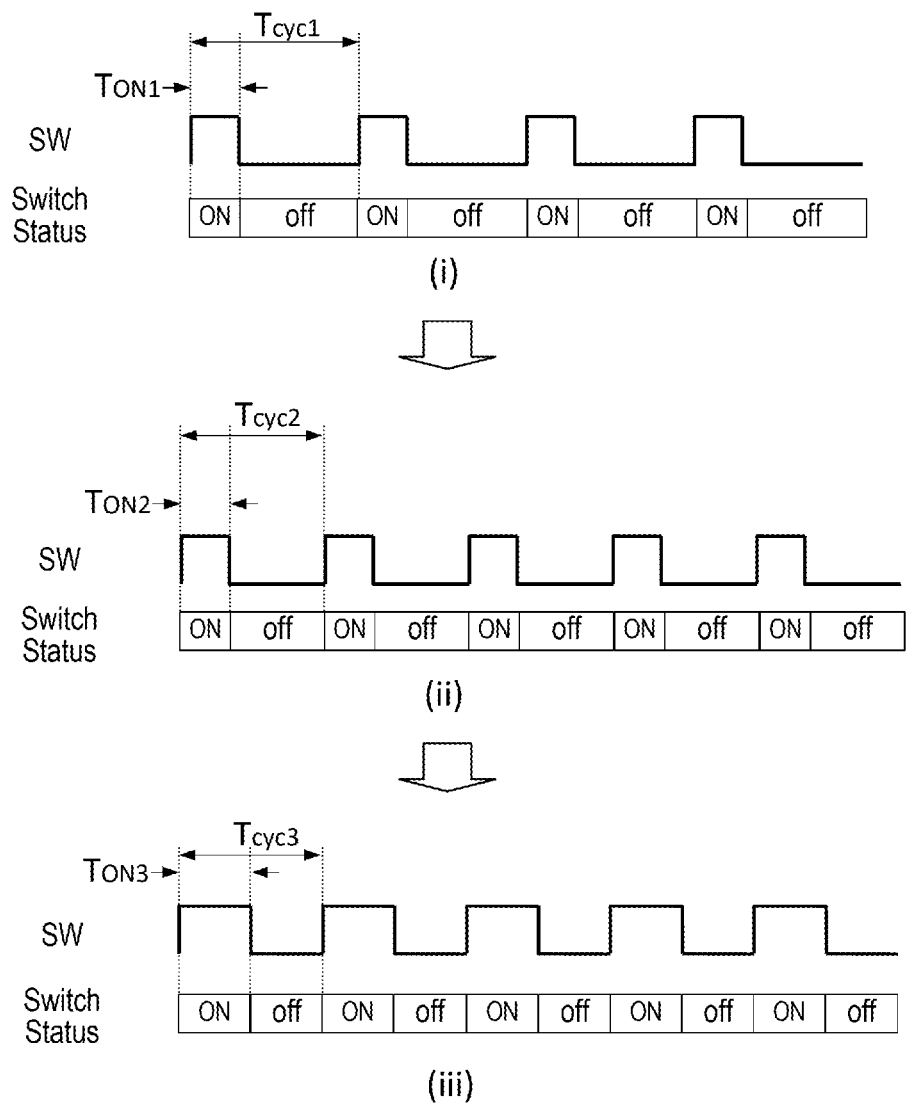
FIGS. 3A and 3B illustrate waveforms related to operations of the circuit shown in FIG. 2 according to an embodiment.

FIG. 3A (i) to (iii) illustrate controlling the switching signal SW to increase output power to reach the target power according to an embodiment.

FIG. 3A (i) illustrates a first waveform of the switching signal SW when the output power of the flyback regulator 2-105 is less than target power. In FIG. 3A (i), a frequency of the switching signal SW is a first frequency, corresponding to an inverse of a first cycle time $T_{CYC1}$, less than a maximum frequency of the PFWM controller 210. During a first on-time $T_{ON1}$, the switching signal SW has a first value (e.g., a logic high value) to turn on the switching device 220. When the switching device 220 is on, a first winding current flows through the primary winding 235 to cause energy to be stored in the flyback transformer 230.

During the remaining time of the first cycle time $T_{CYC1}$, the switching signal SW has a second value (e.g., a logic low value) to turn off the switching device 220. When the switching device 220 is off, a second winding current flows through the secondary winding 240 and the diode 270 to discharge the energy stored in the flyback transformer 230 and charge the capacitor 250, and thus the output voltage VOUT is generated.

As described above, the flyback regulator 2-105 generates output power based on the first waveform of the switching signal SW. Since the output power generated from the flyback regulator 2-105 is less than the target power and the first frequency of the switching signal SW is less than the maximum frequency of the PFWM controller 210, the PFWM controller 210 increases the first frequency of the first waveform to increase the output power, resulting in a second waveform as shown in FIG. 3A (ii).

FIG. 3A (ii) illustrates the second waveform of the switching signal SW having a second frequency higher than the first frequency of the first waveform. That is, a second cycle time $T_{CYC2}$ of the second waveform is shorter than the first cycle time $T_{CYC1}$ while a second on-time $T_{ON2}$ remains substantially the same as the first on-time $T_{ON1}$.

The PFWM controller 210 continues to increase the second frequency of the switching signal SW until the output power of the flyback regulator 2-105 is substantially equal to or greater than the target power or the second frequency reaches the maximum frequency of the PFWM controller 210. In an embodiment, the maximum frequency is programmable to be in a range from 120 KHz to 130 KHz. When the second frequency reaches the maximum frequency and the output power of the flyback regulator 2-105 is still less than the target power, the PFWM controller 210 increases the on-time of the switching signal SW, producing a third waveform as shown in FIG. 3A (iii), in order to further increase the output power.

FIG. 3A (iii) illustrates the third waveform of the switching signal SW having a third on-time $T_{ON3}$ longer than the second on-time $T_{ON2}$ of the second waveform. A third frequency of the third waveform remains substantially the same as the second frequency of the second waveform. That is, the third cycle time $T_{CYC3}$ of the third waveform remains substantially the same as the second cycle time $T_{CYC2}$.

The PFWM controller 210 continues to increase the third on-time $T_{ON3}$ of the switching signal SW until the output power becomes substantially equal to or greater than the target power.

When the output power of the flyback regulator 2-105 becomes substantially equal to the target power, the PFWM controller 210 stops further increasing the third on-time $T_{ON3}$ of the switching signal SW. The term "substantially equal to the target power" as used in this disclosure refers to a case in which a difference between the output power and the target power is less than or equal to a predetermined threshold value. In an embodiment, the predetermined threshold value ranges from 1% to 100% of the target power.

Figure 3B:
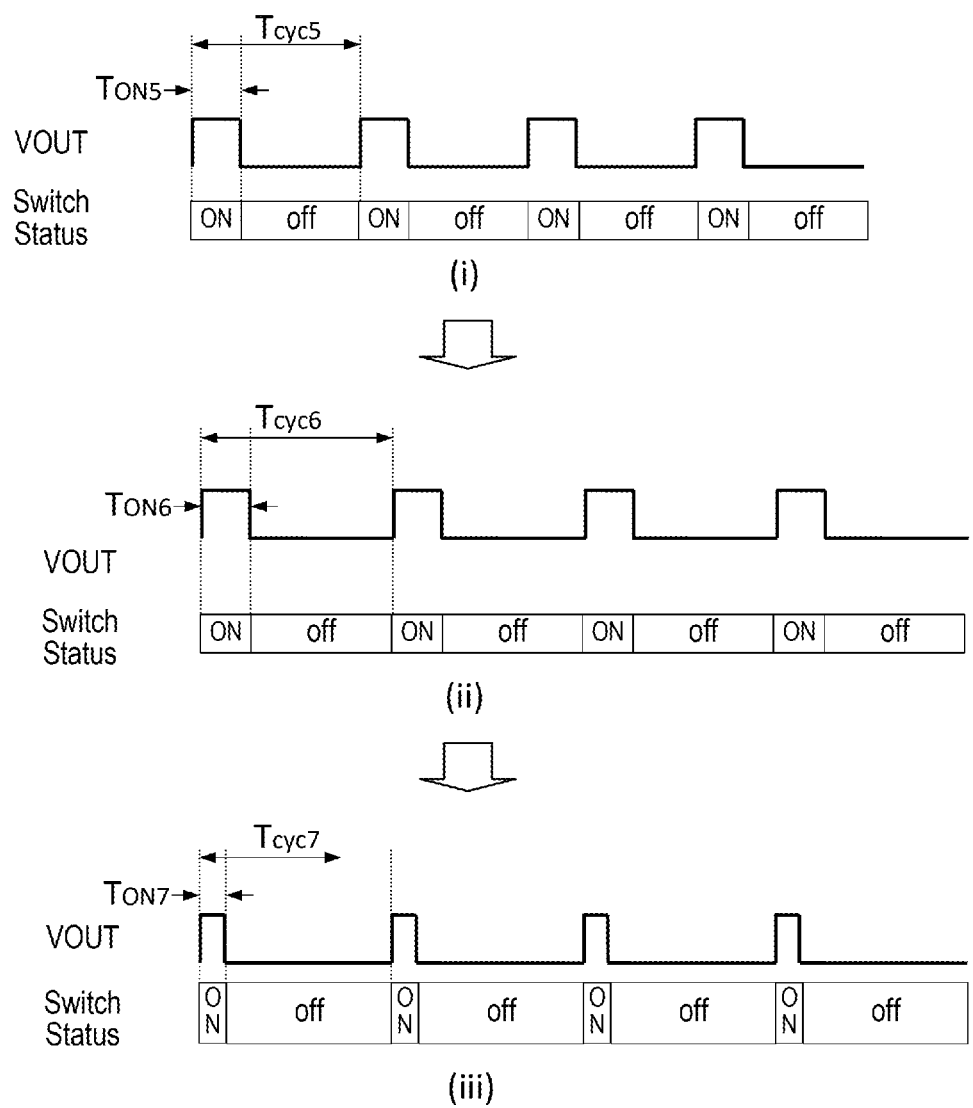

When, as a result of increasing the third on-time $T_{ON3}$ of the switching signal SW, the output power becomes substantially greater than the target power, the PFWM controller 210 decreases the output power using the process illustrated in FIG. 3B.

FIG. 3B (i) to (iii) illustrate controlling the switching signal SW to decrease output power to reach the target power according to an embodiment.

FIG. 3B (i) illustrates a fifth waveform of the switching signal SW when the output power of the flyback regulator 2-105 is greater than target power. In FIG. 3B (i), a frequency of the switching signal SW is a fifth frequency, corresponding to an inverse of a fifth cycle time $T_{CYC5}$, greater than a minimum frequency of the PFWM controller 210. The switching signal SW has a first value (e.g., a logic high value) to turn on the switching device 220 during a fifth on-time $T_{ON5}$, and has a second value (e.g., a logic low value) to turn off the switching device 220 during the remaining time of the fifth cycle time $T_{CYC5}$.

Since the output power generated based on the fifth waveform of the switching signal SW is greater than the target power and the fifth frequency is greater than the minimum frequency of the PFWM controller 210, the PFWM controller 210 decreases a fifth frequency of the fifth waveform to decrease the output power, resulting in a sixth waveform as shown in FIG. 3B (ii).

FIG. 3B (ii) illustrates the sixth waveform of the switching signal SW having a sixth frequency lower than the fifth frequency of the fifth waveform. That is, a sixth cycle time $T_{CYC6}$ of the sixth waveform is longer than the fifth cycle time $T_{CYC5}$ while a sixth on-time $T_{ON6}$ remains substantially the same as the fifth on-time $T_{ON5}$.

The PFWM controller 210 continues to decrease the sixth frequency of the switching signal SW until the output power of the flyback regulator 2-105 is substantially equal to or less than the target power or the sixth frequency reaches the minimum frequency of the PFWM controller 210. In an embodiment, the minimum frequency is programmable to be in a range from 70 KHz to 90 KHz. When the sixth frequency reaches the minimum frequency and the output power of the flyback regulator 2-105 is still greater than the target power, the PFWM controller 210 decreases the on-time of the switching signal SW, producing a seventh waveform as shown in FIG. 3B (iii), thereby further decreasing the output power.

FIG. 3B (iii) illustrates the seventh waveform of the switching signal SW having a seventh on-time $T_{ON7}$ shorter than the sixth on-time $T_{ON6}$ of the sixth waveform. A seventh frequency of the seventh waveform remains substantially the same as the sixth frequency of the sixth waveform. That is, the seventh cycle time $T_{CYC7}$ of the seventh waveform remains substantially the same as the sixth cycle time $T_{CYC6}$.

The PFWM controller 210 continues to decrease the seventh on-time $T_{ON7}$ of the switching signal SW until the output power becomes substantially equal to or less than the target power. When the output power of the flyback regulator 2-105 becomes substantially equal to the target power, the PFWM controller 210 stops further decreasing the seventh on-time $T_{ON7}$ of the switching signal SW.

When, as a result of decreasing the seventh on-time $T_{ON7}$ of the switching signal SW, the output power becomes substantially less than the target power, the PFWM controller 210 increases the output power using the process illustrated in FIG. 3A.

Figure 4:
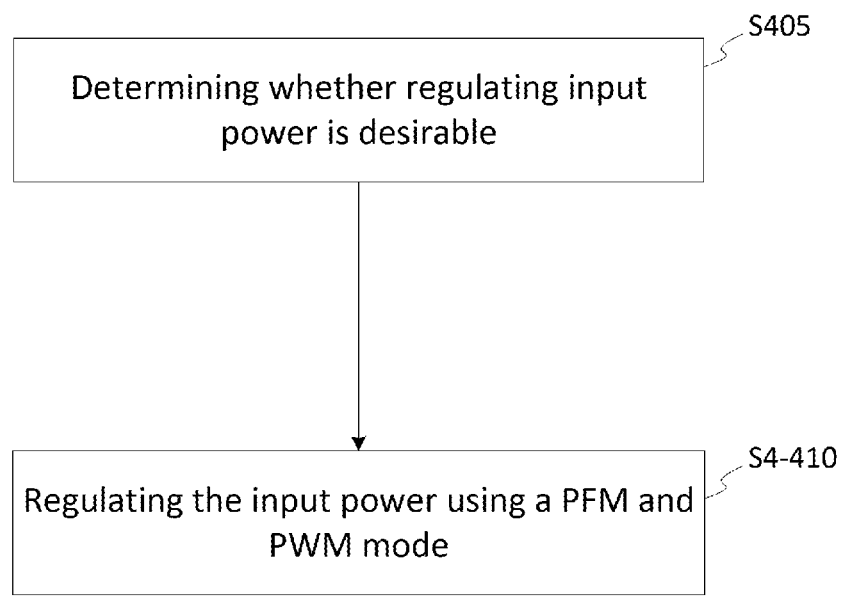
FIG. 4 is a flowchart illustrating a process of controlling a power regulator according to an embodiment.

FIG. 4 is a flowchart illustrating a process 400 of controlling a power regulator according to an embodiment. Although the flowchart shows the process 400 being carried out in a particular order, embodiments are not limited thereto.

At S405, the process 400 determines whether regulating input power by a power regulator is desirable based on output power and target power. In an embodiment, the power regulator is a flyback regulator.

At S4-410, the power regulator regulates the input power to generate the output power substantially equal to the target power based on a combined PFM and PWM mode. In an embodiment, the power regulator operates by adjusting a frequency of a signal until either the output power is substantially equal to the target power or the frequency of the signal is equal to a minimum or maximum frequency, and adjusting an on-time of the signal until the output power reaches the target power when the frequency of the signal is equal to the minimum or maximum frequency. In another embodiment, the power regulator operates by adjusting an on-time of a signal until either the output power is substantially equal to the target power or the on-time of the signal is equal to a minimum or maximum duration, and adjusting a frequency of the signal until the output power reaches the target power when the on-time of the signal is equal to the minimum or maximum duration.

Figure 5:
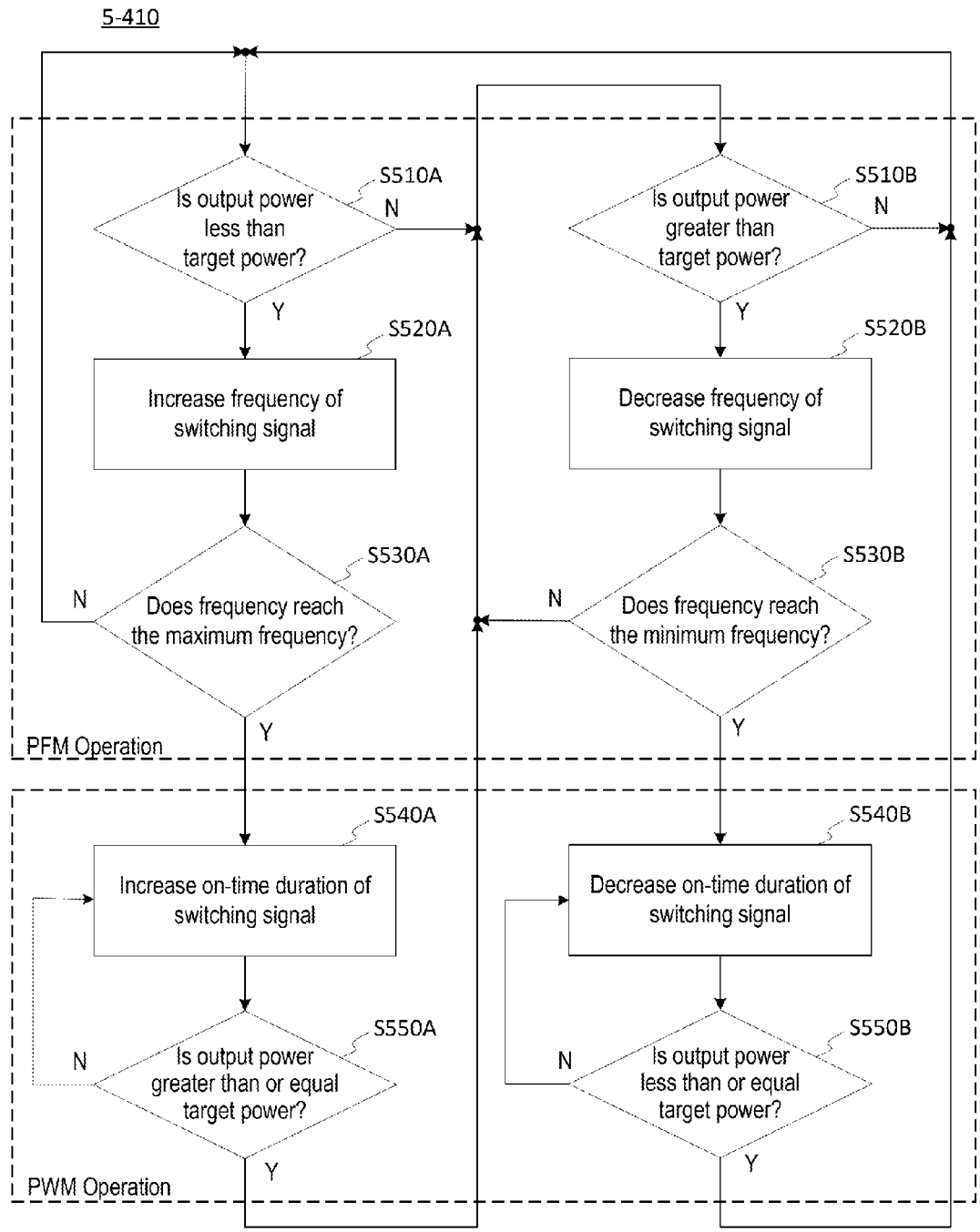
FIG. 5 illustrates a process of increasing and decreasing output power of a power regulator according to an embodiment.

FIG. 5 illustrates a process 5-410 of controlling a switching signal to increase output power of a power regulator to reach target power according to an embodiment. In this embodiment, the power regulator generates the output power based on the switching signal.

At S510A, the process 5-410 determines whether the output power is less than the target power. If the output power is less than the target power, the process 5-410 proceeds to S520A. Otherwise, the process 5-410 proceeds to S510B.

At S520A, the process 5-410 increases a frequency of the switching signal to increase the output power while an on-time of the switching signal remains substantially the same.

At S530A, the process 5-410 determines whether the frequency of the switching signal reaches the maximum frequency of the switching signal. If the switching signal reaches the maximum frequency, the process 5-410 proceeds to S540A. Otherwise, the process 5-410 goes back to S510A to determine whether to continue to increase the output power.

At S540A, the process 5-410 increases an on-time of the switching signal to further increase the output power while the frequency of the switching signal remains substantially the same.

At S550A, the process 5-410 determines whether the output power is greater than or equal to the target power. If the output power is greater than or equal to the target power, the process 5-410 proceeds to S510B. Otherwise, the process 5-410 goes back to S540A to further increase the output power. In an embodiment, if the output power is substantially equal to the target power, the process 5-410 is terminated.

At S510B, the process 5-410 determines whether the output power is greater than the target power. If the output power is greater than the target power, the process 5-410 proceeds to S520B. Otherwise, the process 5-410 proceeds to S510A.

At S520B, the process 5-410 decreases the frequency of the switching signal to decrease the output power while the on-time of the switching signal remains substantially the same.

At S530B, the process 5-410 determines whether the frequency of the switching signal reaches the minimum frequency of the switching signal. If the switching signal reaches the minimum frequency, the process 5-410 proceeds to S540B. Otherwise, the process 5-410 goes back to S510B to determine whether to continue to decrease the output power.

At S540B, the process 5-410 decreases an on-time of the switching signal to further decrease the output power while the frequency of the switching signal remains substantially the same.

At S550B, the process 5-410 determines whether the output power is less than or equal to the target power. If the output power is less than or equal to the target power, the process 5-410 proceeds to S510A. Otherwise, the process 5-410 goes back to S540B to further decrease the output power. In an embodiment, if the output power is substantially equal to the target power, the process 5-410 is terminated.

In the process 5-410, a first loop comprised of S510A, S520A, and S530A and a second loop comprised of S510B, S520B, and S530B each correspond to PFM operation. A third loop comprised of S540A and S550A and a fourth loop comprised of S540B and S550B each correspond to PWM operation.

Although the process 5-410 are performed in the order of the PFM operation until a frequency limit is reached, PWM operation, and then a return to PFM operation, embodiments are not limited thereto. In an embodiment, a process of controlling a power regulator is performed in the order of the PWM operation until a pulse duration limit is reached, PFM operation, and then a return to PWM operation.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. A method comprising:
   generating output power based on a switching signal;
   comparing the output power to a target power; and
   increasing or decreasing the output power according to a result of comparing the output power to the target power, by performing pulse frequency modulation (PFM) at a first time and pulse width modulation (PWM) at a second time, the second time being different from the first time;
   wherein increasing the output power includes:
   determining whether a frequency of the switching signal is less than a maximum frequency of the switching signal;
   increasing the frequency of the switching signal and maintaining an on-time of the switching signal substantially the same when the frequency of the switching signal is less than the maximum frequency; and
increasing the on-time of the switching signal and maintaining the frequency of the switching signal substantially the same when the frequency of the switching signal is equal to or greater than the maximum frequency.

2. The method of claim 1, wherein the maximum frequency of the switching signal is in a range from 120 KHz to 130 KHz.

3. The method of claim 1, wherein increasing the output power further includes:
determining whether the on-time of the switching signal is less than a maximum duration of the switching signal;
increasing the on-time of the switching signal and maintaining the frequency of the switching signal substantially the same when the on-time of the switching signal is less than the maximum duration; and
increasing the frequency of the switching signal and maintaining the on-time of the switching signal substantially the same when the on-time of the switching signal is equal to or greater than the maximum duration.

4. The method of claim 1, wherein decreasing the output power includes:
determining whether the frequency of the switching signal is greater than a minimum frequency;
decreasing the frequency of the switching signal and maintaining the on-time of the switching signal substantially the same when the frequency of the switching signal is greater than the minimum frequency; and
decreasing the on-time of the switching signal and maintaining the frequency of the switching signal substantially the same when the frequency of the switching signal is equal to or less than the minimum frequency.

5. The method of claim 4, wherein the minimum frequency of the switching signal is in a range from 70 KHz to 90 KHz.

6. The method of claim 1, wherein decreasing the output power includes:
determining whether the on-time of the switching signal is greater than a minimum duration of the switching signal;
decreasing the on-time of the switching signal and maintaining the frequency of the switching signal substantially the same when the on-time of the switching signal is greater than the minimum duration; and
decreasing the frequency of the switching signal and maintaining the on-time of the switching signal substantially the same when the on-time of the switching signal is equal to or less than the minimum duration.

7. The method of claim 1, further comprising:
receiving a signal indicative of the target power from an external device.

8. The method of claim 1, further comprising:
detecting the output power;
providing a signal indicative of the detected output power; and
determining whether the output power becomes substantially equal to the target power based on the provided signal.

9. An apparatus comprising:
a power regulator configured to generate output power based on a switching signal; and
a pulse frequency and width modulation (PFWM) controller coupled to the power regulator, and configured to compare the output power to a target power and to increase or decrease the output power according to a result of comparing the output power to the target power, by performing pulse frequency modulation (PFM) at a first time and pulse width modulation (PWM) at a second time, the second time being different from the first time,
wherein the PFWM controller is configured to determine whether a frequency of the switching signal is greater than a minimum frequency, and
wherein the PFWM controller is configured to decrease the frequency of the switching signal and maintain an on-time of the switching signal substantially the same to decrease the output power when the frequency of the switching signal is greater than the minimum frequency.

10. The apparatus of claim 9, further comprising:
a switching device coupled between the power regulator and the PFWM controller and configured to receive the switching signal from the PFWM controller and cause a current to flow through the switching device according to the switching signal,
wherein the PFWM controller is configured to determine whether the frequency of the switching signal is less than a maximum frequency of the switching signal,
wherein the PFWM controller is configured to increase the frequency of the switching signal and maintain the on-time of the switching signal substantially the same to increase the output power when the frequency of the switching signal is less than the maximum frequency, and
wherein the PFWM controller is configured to increase the on-time of the switching signal and maintain the frequency of the switching signal substantially the same to increase the output power when the frequency of the switching signal is equal to or greater than the maximum frequency.

11. The apparatus of claim 10, wherein the maximum frequency of the switching signal is in a range from 120 KHz to 130 KHz.

12. The apparatus of claim 9, further comprising:
a switching device coupled between the power regulator and the PFWM controller and configured to receive the switching signal from the PFWM controller and cause a current to flow through the switching device according to the switching signal,
wherein the PFWM controller is configured to determine whether the on-time of the switching signal is less than a maximum duration of the switching signal,
wherein the PFWM controller is configured to increase the on-time of the switching signal and maintain the frequency of the switching signal substantially the same to increase the output power when the on-time of the switching signal is less than the maximum duration, and
wherein the PFWM controller is configured to increase the frequency of the switching signal and maintain the on-time of the switching signal substantially the same to increase the output power when the on-time of the switching signal is equal to or greater than the maximum duration.

13. The apparatus of claim 9, further comprising:
a switching device coupled between the power regulator and the PFWM controller and configured to receive the switching signal from the PFWM controller and cause a current to flow through the switching device according to the switching signal, wherein the PFWM controller is configured to decrease the on-time of the switching signal and maintain the frequency of the switching signal substantially the same to decrease the output power when the frequency of the switching signal is equal to or less than the minimum frequency.

14. The apparatus of claim 13, wherein the minimum frequency of the switching signal is in a range from 70 KHz to 90 KHz.

15. The apparatus of claim 9, further comprising:
a switching device coupled between the power regulator and the PFWM controller and configured to receive the switching signal from the PFWM controller and cause a current to flow through the switching device according to the switching signal,
wherein the PFWM controller is configured to determine whether the on-time of the switching signal is greater than a minimum duration of the switching signal,
wherein the PFWM controller is configured to decrease the on-time of the switching signal and maintain the frequency of the switching signal substantially the same to decrease the output power when the on-time of the switching signal is greater than the minimum duration, and
wherein the PFWM controller is configured to decrease the frequency of the switching signal and maintain the on-time of the switching signal substantially the same to decrease the output power when the on-time of the switching signal is equal to or less than the minimum duration.

16. The apparatus of claim 9, wherein the PFWM controller is configured to receive a signal indicative of the target power from an external device.

17. The apparatus of claim 9, wherein the power regulator includes:
an output configured to provide the output power; and
a feedback circuit coupled between the output of the power regulator and the PFWM controller, and configured to provide a signal indicative of the output power, and
wherein the PFWM controller is configured to determine whether the output power becomes substantially equal to the target power based on the provided signal.

18. The method of claim 1, further comprising:
determining whether the on-time of the switching signal is less than a maximum duration of the switching signal when the output power is less than the target power; and
determining whether the on-time of the switching signal is greater than a minimum duration of the switching signal when the output power is greater than the target power.

19. The apparatus of claim 9, wherein the PFWM controller is further configured to determine whether the on-time of the switching signal is less than a maximum duration of the switching signal when the output power is less than the target power, and to determine whether the on-time of the switching signal is greater than a minimum duration of the switching signal when the output power is greater than the target power.

20. The method of claim 1, wherein the on-time of the switching signal is increased until the output power becomes greater than the target power, the method further comprising:
decreasing the frequency of the switching signal and maintaining the on-time of the switching signal substantially the same until the output power becomes substantially equal to the target power.

* * * * *